Oct. 19, 1943.   J. HALTENBERGER   2,332,377
AUTOMOBILE HOOD
Filed June 17, 1940

INVENTOR.

Patented Oct. 19, 1943

2,332,377

UNITED STATES PATENT OFFICE 2,332,377

AUTOMOBILE HOOD

Jules Haltenberger, Ann Arbor, Mich.

Application June 17, 1940, Serial No. 340,922

2 Claims. (Cl. 180—69)

My invention relates to automobile hood constructions, and this application is a continuation-in-part, of my co-pending applications for "Automobile hood," Serial No. 285,539 filed July 20, 1939, now Patent No. 2,204,990, and Serial No. 315,821 filed Jan. 26, 1940, now Patent No. 2,204,991.

It has been proposed to provide a hood with front hinges, and to terminate it at the front of the usual door pillars. It is here proposed, to provide an automobile hood, with demountable integral hood side panels and fenders, terminating them at the front doors (as disclosed in my Patent No. 2,188,891 of Jan. 30, 1940) and to mount a front hinged hood above the panels and to terminate it directly at the front doors, both for lengthening effect, and for the elimination of matched surfaces.

A further object is to provide a front hinged hood with side walls, and terminate it directly at the front doors, both for lengthening effect, and for the reduction of surface edge matched lines, from eight to four.

A further object is to provide a front hinged hood with a slam lock, having a spring arranged to yieldingly depress and laterally contract the hood, when in closed position.

Further and more particularly expressed objects will appear as the description proceeds.

Figure 1:
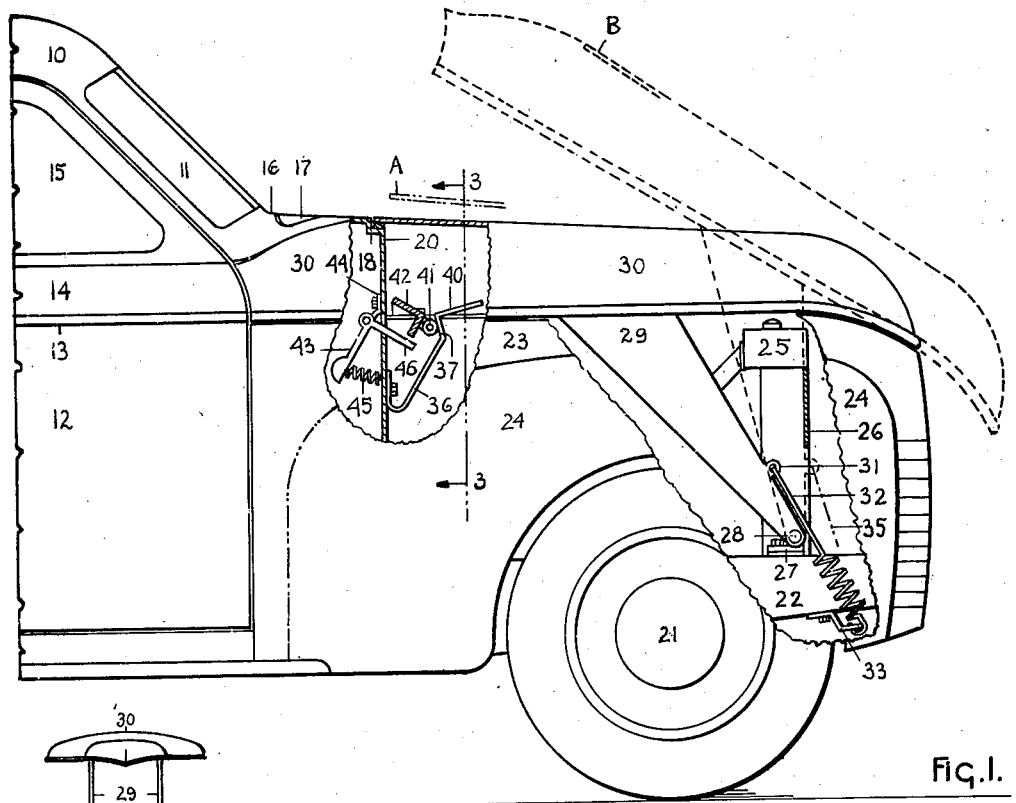
Figure 2:
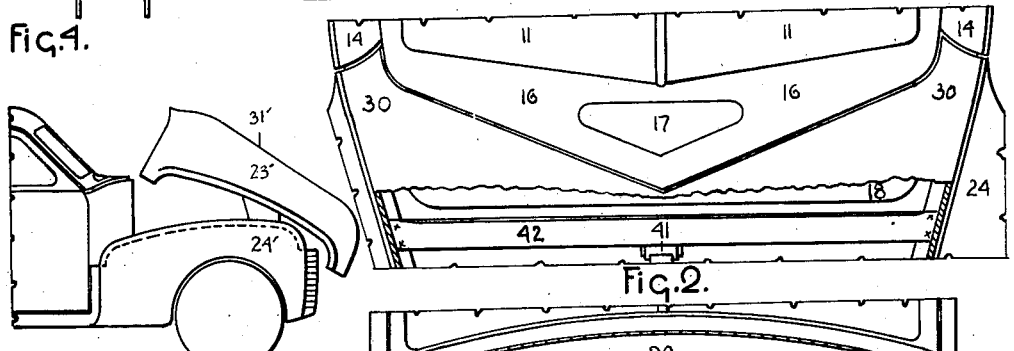
Figure 6:
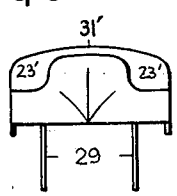
Figure 3:
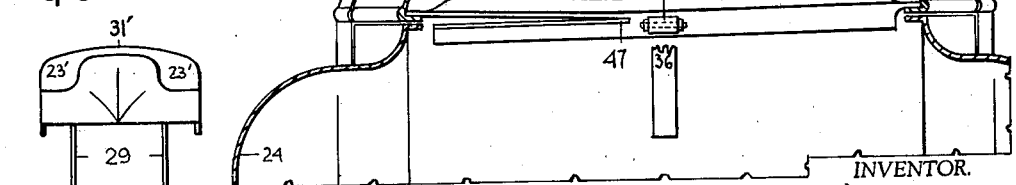

My invention may be embodied in the forms illustrated: Here Fig. 1 is a side elevation of the front end of an automobile with a closed hood, and with parts in sections; Fig. 2 is a plan view of a part illustrated in Fig. 1; Fig. 3 is a section substantially on line 3—3 of Fig. 1; Fig. 4 is a front view of the hood unit, here illustrated in a smaller scale; Fig. 5 is a side elevation of the front end of an automobile with an opened hood, having hood side walls; Fig. 6 is a front view of the hood unit illustrated in Fig. 5.

Referring to Figs. 1 to 4 inclusive it will be seen that under a roof 10 and windshields 11 front doors 12 are provided, having beads 13, rounded belts 14 and door glasses 15. In front of the windshield a ventilator shelf 16 is provided supporting a ventilator 17, the fore and full length side portions of this shelf being depressed to form a cowl and hood ledge 18 which forwardly terminates in a dash board 20.

Front wheels 21 support the front end of a usual frame 22 arranged to carry the usual essentials including demountable hood side panels 23 and therewith integral fenders 24. The frame supports a radiator 25 and it is braced by plates 26 (only one shown). Straddling the radiator, hood hinge brackets 27 (only one shown) having hood fulcrum pins 28 are supported on the frame. These brackets operatively support leaning hood legs 29 secured to the hood 30 in any desired manner.

As is clear from Fig. 1 at least one leg 29 is provided with a spring engaging eyelet 31 anchoring a tensioned coil spring 32, the lower end of which is anchored in bracket 33 on frame 22. When the hood is in closed position, the hood fulcrum pin is substantially between the spring anchorage points, in which position the spring is ineffective. When the hood is opened and the legs rest against the radiator bracing plates 26 a new spring position (indicated by chain center line 35) will make this spring effective to hold the hood in the final open position indicated by dotted lines B.

The locking of the hood is effected by a simple spring 36 secured to the dash board 20 in any desired manner. This spring is formed into a hood depressing cam face 37, and hood lifting and also slam closing face 40. When in closed position face 37 exerts a 45° component depression pressure on a roller 41 carried by a part angle iron or distance brace 42 secured to the hood (as by spot welding) to yieldingly depress the hood.

For opening of the hood, on the driving compartment side of dash board 20, an operating lever 43 is provided on bracket 44, which is held in inactive position by a coil spring 45. Lever 43 is provided with a leg 46 passing through dash board 20. As is clear from Fig. 1, upon pressure on lever 43 the front end of leg 46 will forcibly lift the angle iron 42 and thereby carry the hood rear end to an intermediate position indicated by part chain line A. In this position the roller 41 is now seated on the cam face 40 and the spring 36 will assist in the opening of the hood.

In Fig. 3 is shown one way in which the rear end of the hood may be yieldingly supported when in closed position. As shown, the angle iron 42 is provided with a saw cut 47. By eliminating the angular bracing in this one half, the upper part of this half of the angle iron is turned into a one-way flexible blade spring. The flexure of this spring contracts the lateral edges of the hood, to hug the hood ledge in three directions. Obviously the depending part of the angle iron, below the saw cut, will prevent the up flexing of the blade, thereby assuring a forcible lifting of the hood to the above described intermediate position A.

This construction is simple and inexpensive and lends itself to the rationing of spring tensions whereby a quick pressure and quick release on the lever in the driving compartment, will automatically open the hood without any outside assistance.

Figs. 5 and 6 schematically illustrate the use of the above described construction when used with a hood 31' having side walls 23' separated from fenders 24'.

What applicant claims as his invention is:

1. In an automobile, a body, a front hinged hood having depending walls, a supporting structure on said body, hinge means connecting said hood to said automobile, a releasable lock depressing and contracting said depending walls of said hood against said supporting structure, and means associated with said lock forcibly separating said hood and supporting structure upon release operation of said lock.

2. In an automobile having side frames and a radiator supported between said frames, a front hinged hood, a pair of rigid hinge members connected to said hood rearwardly from its forward end and extending angularly downwardly and forwardly, pivotal connections between the lower ends of said hinge members and said side frames on opposite sides of said radiator, a spring having one end connected to one of said hinge members intermediate its ends, the opposite end of said spring being connected to one of said frame members forwardly from said pivotal connection and to one side thereof.

JULES HALTENBERGER.